US008502479B2

United States Patent
Kao et al.

(10) Patent No.: US 8,502,479 B2
(45) Date of Patent: Aug. 6, 2013

(54) CURRENT REGULATING CIRCUIT AND LIGHT EMITTING DIODE DEVICE HAVING THE SAME

(75) Inventors: Chih-Chiang Kao, Taipei (TW); Po-Wei Li, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 277 days.

(21) Appl. No.: 13/097,366

(22) Filed: Apr. 29, 2011

(65) Prior Publication Data
US 2011/0285324 A1 Nov. 24, 2011

(30) Foreign Application Priority Data

May 19, 2010 (CN) .......................... 2010 1 0182030

(51) Int. Cl.
*H05B 37/02* (2006.01)
(52) U.S. Cl.
USPC ........................... 315/309; 315/291; 315/195
(58) Field of Classification Search
USPC ............. 315/291, 294, 297, 307–311, 185 R, 315/194, 195
See application file for complete search history.

(56) References Cited

U.S. PATENT DOCUMENTS

| 6,628,085 | B2* | 9/2003 | Yang | 315/169.3 |
|---|---|---|---|---|
| 7,626,346 | B2* | 12/2009 | Scilla | 315/309 |
| 2011/0115406 | A1* | 5/2011 | Wang et al. | 315/294 |
| 2012/0068627 | A1* | 3/2012 | Brooks | 315/309 |

* cited by examiner

*Primary Examiner* — James H Cho
(74) *Attorney, Agent, or Firm* — Rosenberg, Klein & Lee

(57) ABSTRACT

A current regulating circuit is for connection in series between a light emitting diode (LED) and a power source, and includes: a first resistive unit having a first resistance that is proportional to an operation temperature of the LED when the operation temperature is above a predetermined threshold temperature; and a second resistive unit connected in series with said first resistive unit, and having a second resistance that is inversely proportional to the operation temperature of the LED when the operation temperature is above the predetermined threshold temperature. When the operation temperature of the LED is above the predetermined threshold temperature, an effective resistance of said current regulating circuit attributed to said first and second resistive units is proportional to the operation temperature of the LED, and absolute value of a rate of change of the first resistance is larger than that of the second resistance.

11 Claims, 3 Drawing Sheets

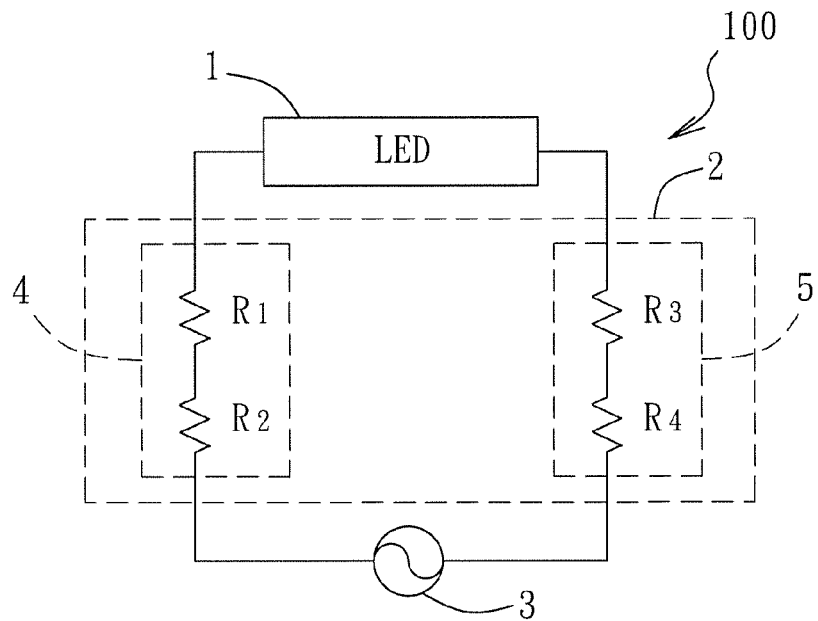
F I G. 3
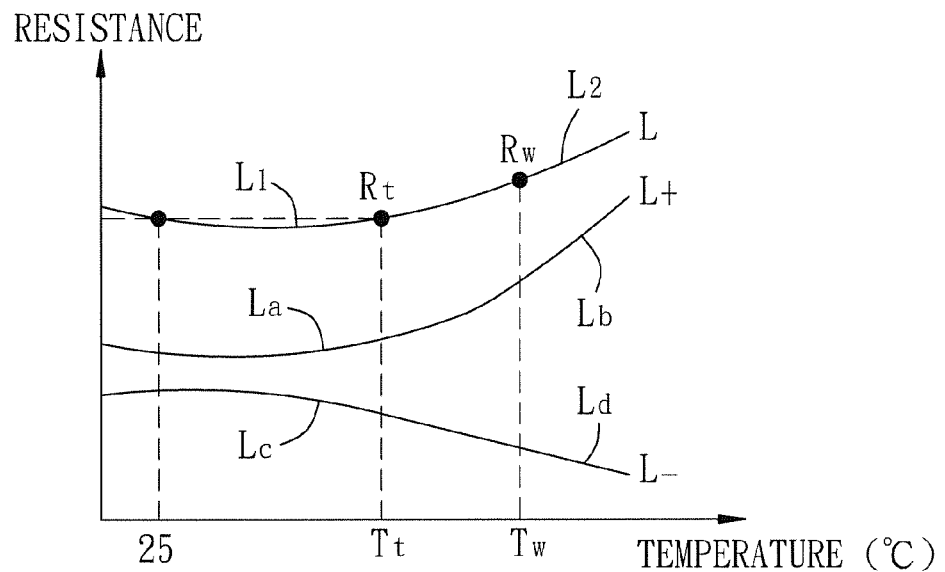
F I G. 4

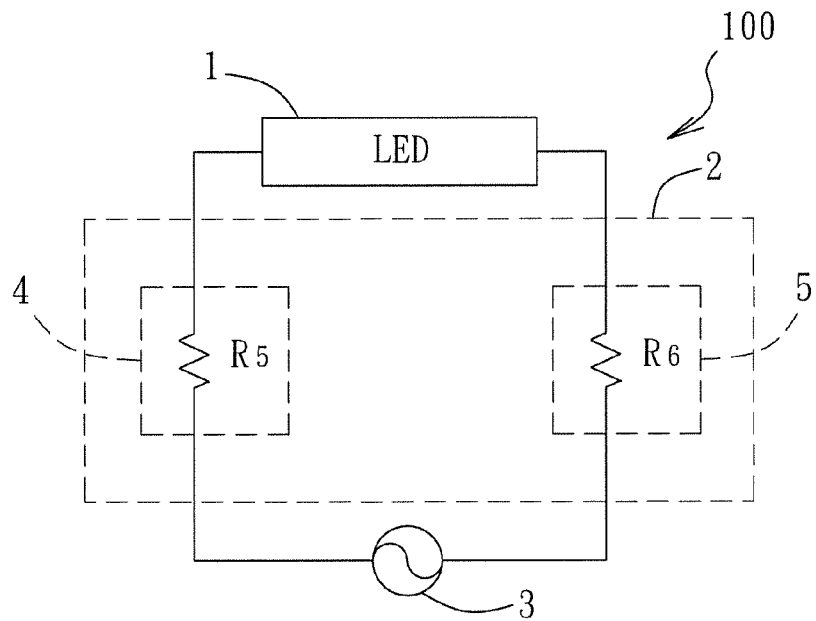
F I G. 5
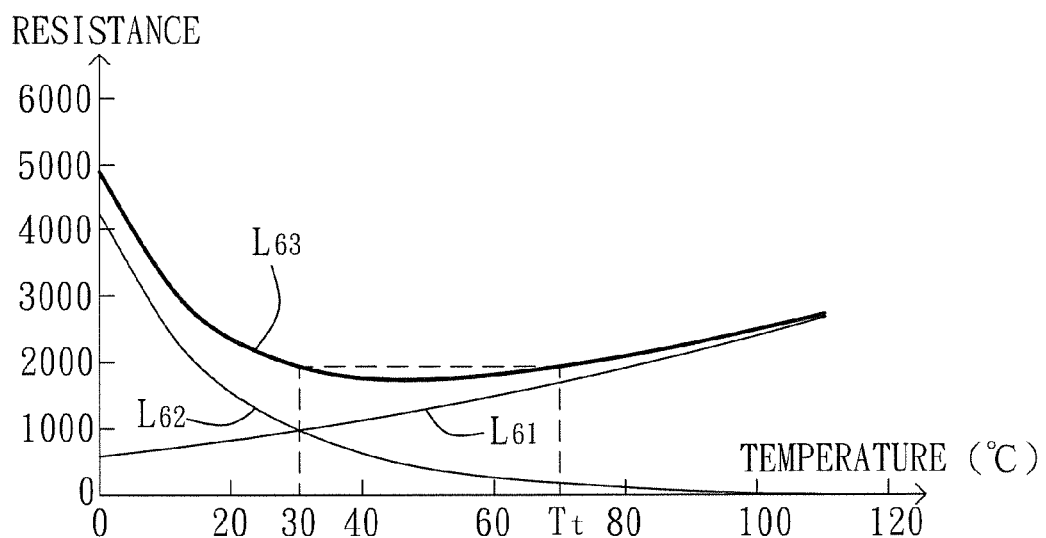
F I G. 6

CURRENT REGULATING CIRCUIT AND LIGHT EMITTING DIODE DEVICE HAVING THE SAME

CROSS-REFERENCE TO RELATED APPLICATION

This application claims priority of Chinese Application No. 201010182030.0, filed on May 19, 2010.

BACKGROUND OF THE INVENTION

1. Field of the Invention

The present invention relates to a current regulating circuit and a light emitting diode device having the same, more particularly to a current regulating circuit for regulating current flowing to a light emitting diode and a light emitting diode device having the same.

2. Description of the Related Art

Referring to FIG. 1, a conventional light emitting diode device 900 is powered by an alternating current (AC) power source, and includes a light emitting diode (LED) 910 and a resistor 920, which has a temperature-insensitive internal resistance (see FIG. 2).

After a long duration of operation at a working temperature ($T_w$) higher than room temperature (i.e., 25 degrees Celsius), ageing of the LED 910 will cause an internal resistance thereof to vary, causing a voltage difference across the light emitting diode 910 to vary, which in turn causes a current flowing across the light emitting diode 910 to fluctuate. As a result, brightness of light emitted by the LED 910 becomes unstable, and durability of the LED 910 is reduced.

SUMMARY OF THE INVENTION

Therefore, an object of the present invention is to provide a current regulating circuit capable of regulating current flowing to a light emitting diode (LED), thereby stabilizing brightness of light emitted by the LED.

Accordingly, a current regulating circuit of the present invention is for connection in series between a light emitting diode (LED) and a power source, and comprises: a first resistive unit having a first resistance that is proportional to an operation temperature of the LED when the operation temperature of the LED is above a predetermined threshold temperature; and a second resistive unit connected in series with the first resistive unit, and having a second resistance that is inversely proportional to the operation temperature of the LED when the operation temperature of the LED is above the predetermined threshold temperature.

When the operation temperature of the LED is above the predetermined threshold temperature, an effective resistance of the current regulating circuit attributed to the first and second resistive units is proportional to the operation temperature of the LED, and absolute value of a rate of change of the first resistance is larger than that of the second resistance.

Another object of the present invention is to provide an LED device capable of emitting light with stable brightness even after long-term use.

Accordingly, a light emitting diode (LED) device of the present invention is adapted to be connected to a power source. The LED device includes an LED, and a current regulating circuit connected to the LED, and adapted to be connected to the power source such that the LED, the current regulating circuit, and the power source are connected in series. The current regulating circuit includes: a first resistive unit having a first resistance that is proportional to an operation temperature of the LED when the operation temperature of the LED is above a predetermined threshold temperature; and a second resistive unit connected in series with the first resistive unit, and having a second resistance that is inversely proportional to the operation temperature of the LED when the operation temperature of the LED is above the predetermined threshold temperature.

When the operation temperature of the LED is above the predetermined threshold temperature, an effective resistance of the current regulating circuit attributed to the first and second resistive units is proportional to the operation temperature of the LED, and absolute value of a rate of change of the first resistance is larger than that of the second resistance.

BRIEF DESCRIPTION OF THE DRAWINGS

Other features and advantages of the present invention will become apparent in the following detailed description of the preferred embodiments with reference to the accompanying drawings, of which:

FIG. 3 is a circuit diagram of the first preferred embodiment of an LED device according to the present invention;

FIG. 4 is a plot illustrating a relationship between an effective resistance of a current regulating circuit of the LED device and an operation temperature of an LED of the LED device, according to the present invention;

FIG. 5 is a circuit diagram of the second preferred embodiment of an LED device according to the present invention; and FIG. 6 is a plot illustrating a relationship between an effective resistance of a current regulating circuit of the LED device of the second preferred embodiment and an operation temperature of the LED of the LED device of the second preferred embodiment, according to the present invention.

DETAILED DESCRIPTION OF THE PREFERRED EMBODIMENTS

Figure 1:
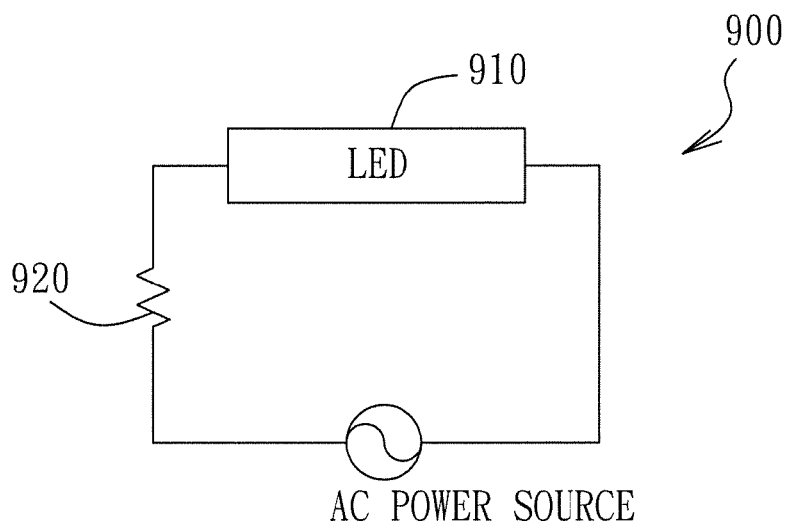
FIG. 1 is a circuit diagram of a conventional light emitting diode (LED) device including a resistor and an LED connected in series with the resistor.
Figure 2:
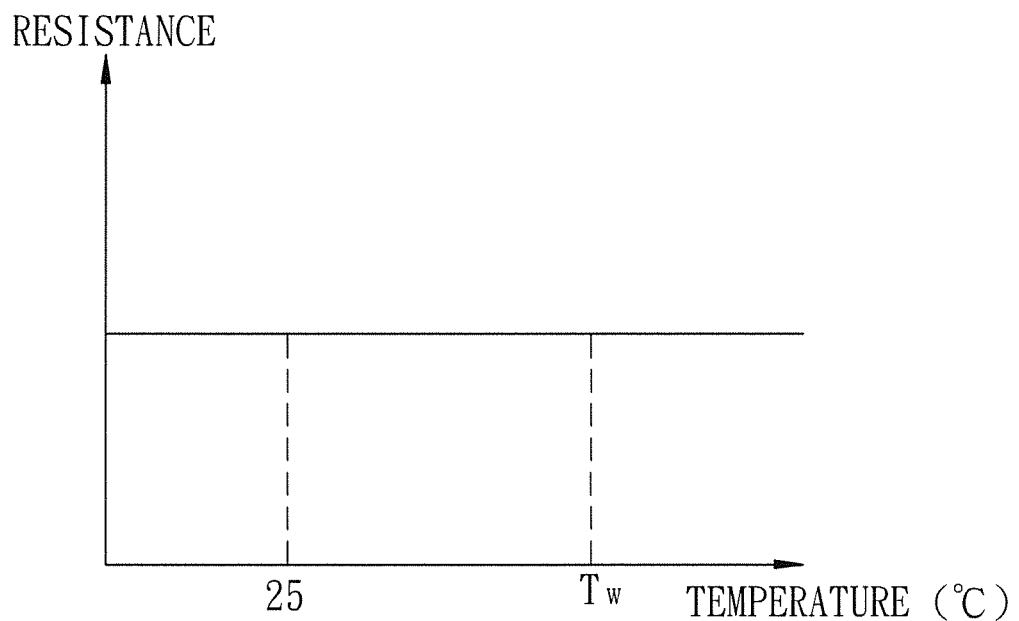
FIG. 2 is a plot illustrating a relationship between resistance of the resistor and an operation temperature of the LED.

Before the present invention is described in greater detail, it should be noted that like elements are denoted by the same reference numerals throughout the disclosure.

Referring to FIG. 3, the first preferred embodiment of a light emitting diode (LED) device 100, according to the present invention, includes an LED 1, and a current regulating circuit 2 connected in series between the LED 1 and an alternating current (AC) power source 3 such that current flowing to the LED 1 is regulated when an operation temperature of the LED 1 is in a temperature range above a predetermined threshold temperature ($T_b$), and when an internal resistance of the LED 1 starts to vary in the temperature range due to ageing, thereby enabling the LED 1 to emit light with stable brightness.

The current regulating circuit 2 includes a series connection of first and second resistive units 4, 5. The AC power source 3, the first resistive unit 4, the LED 1, and the second resistive unit 5 are connected in series in the order given and form a loop. Referring to FIG. 4, Curve (L) defines a relationship between an effective resistance of the current regulating circuit 2, which is a contribution of a first resistance of the first resistive unit 4 and a second resistance of the second resistive unit 5, and the operation temperature of the LED 1. Curve (L)

is divided at the predetermined threshold temperature ($T_t$) into first and second curve sections ($L_1$, $L_2$).

In this embodiment, the first resistive unit 4 includes a series connection of first and second thermistors ($R_1$, $R_2$). Referring to FIG. 4, Curve ($L_+$) defines a relationship between the first resistance of the first resistive unit 4, which is attributed to respective resistances of the first and second thermistors ($R_1$, $R_2$), and the operation temperature of the LED 1. Curve ($L_+$) is also divided at the predetermined threshold temperature ($T_t$) into first and second curve segments ($L_a$, $L_b$). The first thermistor ($R_1$) has a positive temperature coefficient, and the second thermistor ($R_2$) has a negative temperature coefficient. Absolute value of the temperature coefficient of the first thermistor ($R_1$) is not smaller than that of the second thermistor ($R_2$) such that the first resistance of the first resistive unit 4 is proportional to or is in a positive relation with the operation temperature of the LED 1 when the operation temperature of the LED 1 is above the predetermined threshold temperature ($T_t$). In the present embodiment, the temperature coefficients of the first and second thermistors R1, R2 are 1300 m$\Omega$/° C. and −1000 m$\Omega$/° C., respectively.

In this embodiment, the second resistive unit 5 includes a series connection of third and fourth thermistors ($R_3$, $R_4$). Referring to FIG. 4, Curve ($L_-$) defines a relationship between the second resistance of the second resistive unit 5, which is attributed to respective resistances of the third and fourth thermistors ($R_3$, $R_4$), and operation temperature of the LED 1. Curve ($L_-$) is also divided at the predetermined threshold temperature ($T_t$) into third and fourth curve segments ($L_c$, $L_d$). The third thermistor ($R_3$) has a positive temperature coefficient, and the fourth thermistor ($R_4$) has a negative temperature coefficient. Absolute value of the temperature coefficient of the third thermistor ($R_3$) is not greater than that of the fourth thermistor ($R_4$) such that the second resistance of the second resistive unit 5 is inversely proportional to or is in a negative relation with the operation temperature of the LED 1 when the operation temperature of the LED 1 is above the predetermined threshold temperature ($T_t$). In the present embodiment, the temperature coefficients of the third and fourth thermistors (R3, R4) are 500 m$\Omega$/° C. and −2000 m$\Omega$/° C., respectively.

It is to be noted that actual values of the temperature coefficients of the first, second, third, and fourth thermistors ($R_1$, $R_2$, $R_3$, $R_4$) are not limited to such. For example, in other embodiments, the current regulating circuit 2 may be configured such that the first and second thermistors ($R_1$, $R_2$) of the first resistive unit 4 have respective positive temperature coefficients, and that the third and fourth thermistors ($R_3$, $R_4$) of the second resistive unit 5 have respective negative temperature coefficients.

It is worth noting that Curve (L) is the summation of Curves ($L_+$) and ($L_-$). That is, the first curve section ($L_1$) is the summation of the first and third curve segments ($L_a$, $L_c$), and the second curve section ($L_2$) is the summation of the second and fourth curve segments ($L_b$, $L_d$). Furthermore, in the present embodiment, the effective resistance of the second resistive unit 5 at an initial temperature (e.g., room temperature) is not smaller than one-half of that of the first resistive unit 4 at the initial temperature.

Moreover, in the present embodiment, when the operation temperature of the LED 1 is equal to or lower than the predetermined threshold temperature ($T_t$), the effective resistance of the current regulating circuit 2 is substantially non-varying. Specifically, when the operation temperature of the LED 1 is equal to or lower than the predetermined threshold temperature ($T_t$), absolute value of a rate of change of the first resistance is approximate to that of the second resistance, and absolute value of a rate of change of the effective resistance is below a predetermined value. In this present embodiment, the predetermined value is 5%. In other embodiments, the predetermined value can be configured according to design need. Since the internal resistance of the LED 1 is substantially non-varying when the operation temperature of LED 1 is equal to or below the predetermined threshold temperature ($T_t$), an overall resistance of the LED 1 and the current regulating circuit 2 is substantially non-varying when the operation temperature is equal to or below the predetermined threshold temperature ($T_t$), such that the LED 1 emits light with stable brightness.

Since the effective resistance of the current regulating circuit 2 is proportional to the operation temperature of the LED 1 when the operation temperature is above the threshold temperature ($T_t$) (i.e., the second curve section $L_2$ of Curve L), when current flowing from the AC power source 3 to the LED 1 is reduced as a result of an increase in the internal resistance of the LED 1 caused by ageing and long duration of operation in the temperature range above the predetermined threshold temperature ($T_t$), the reduction in current flowing to the LED 1 causes the effective resistance of the current regulating circuit 2 to decrease due to a reduction in the operation temperature of the LED 1, which in turn cancels out the increase in the internal resistance of the LED 1, thereby regulating current flowing to the LED 1.

Thus, the overall resistance attributed to the LED 1 and the current regulating circuit 2 is substantially non-varying, such that brightness of light emitted by the LED 1 is stabilized, and durability of the LED 1 is relatively improved. In addition, when current flowing from the AC power source 3 to the LED 1 varies due to variation in voltage of the AC power source 3, the current regulating circuit 2 is also able to reduce the variation in current attributed to the variation in the supply voltage.

In other words, when the operation temperature of the LED 1 is above the predetermined threshold temperature ($T_t$), the absolute value of the rate of change of the first resistance (i.e., the second curve segment $L_b$) is larger than that of the second resistance of the second resistive unit 5 (i.e., the fourth curve segment $L_d$), such that the effective resistance of the current regulating circuit 2 is proportional to the operation temperature when the operation temperature is above the predetermined threshold temperature ($T_t$). Specifically, in the present embodiment, when the operation temperature is above the predetermined threshold temperature ($T_t$), the absolute value of the rate of change of the first resistance within a temperature increment of 10 degree Celsius is at least twice larger than that of the second resistance.

In the present embodiment, when the operation temperature of the LED 1 is above the threshold temperature ($T_t$), a rate of change of the effective resistance of the series connection of the first resistive unit 4 and the second resistive unit 5 (i.e., a rate of change of the effective resistance of the current regulating circuit 2) within the temperature increment of 10 degrees Celsius is at least 5% (preferably, 5% to 8%). It is to be noted that the rate of change of the effective resistance of the series connection may be changed to meet design needs by implementing the first and second resistive units 4, independently using different combinations of thermistors. For example, in an application where the threshold temperature ($T_t$) is 70 degree Celsius and the operation temperature of the LED 1 increases from 70 degree Celsius to 80 degree Celsius, the rate of change of the effective resistance of the current regulating circuit 2 within the temperature increment of 10 degrees Celsius is at least 5%. Furthermore, in other embodiments, the temperature increment is not limited to such, and may be adjusted according to electrical characteristics of the LED 1.

Referring to FIG. 5, in the second preferred embodiment, the first resistive unit 4 includes a first thermistor ($R_5$) with a positive temperature coefficient, and the second resistive unit 5 includes a second thermistor ($R_6$) with a negative temperature coefficient. Absolute value of the temperature coefficient of the first thermistor ($R_5$) is not smaller than that of the second thermistor (R6).

Referring to FIG. 6, the temperature coefficient of the first thermistor ($R_5$) is 1500 mΩ/° C. and is represented by Curve ($L_{61}$), the temperature coefficient of the second thermistor $R_6$ is −4000 mΩ/° C. and is represented by Curve ($L_{62}$), and summation of which is represented by Curve ($L_{63}$). Apparently, the current regulating circuit 2 of the second preferred embodiment also has a substantially flat effective resistance when operation temperature of the LED 1 is between 30 degree Celsius and 70 degree Celsius, and an increasing effective resistance when the operation temperature of the LED 1 is above 70 degree Celsius.

Moreover, in other embodiments with a configuration similar to that of the second preferred embodiment, the first and second resistive units 4, 5 may be configured such that first and second thermistors ($R_5$, $R_6$) have temperature coefficients of 400 and −500, respectively, so that a sum of the first and second resistances of the first and second resistive units 4, 5 (i.e., the effective resistance of the current regulating circuit 2) is substantially non-varying when the operation temperature is in the temperature range from 25 to 50 degrees Celsius. However, configuration of the current regulating circuit 2 is not limited to such, as long as the effective resistance of the current regulating circuit 2 is substantially non-varying within a predetermined temperature range below the threshold temperature ($T_t$), and increases with the operation temperature of the LED 1 when the operation temperature is above the threshold temperature ($T_t$) (i.e., a tangential line of the curve (L) at a temperature above the threshold temperature ($T_t$) has a positive rate of slope).

In summary, the current regulating circuit 2 of the present invention is able to regulate current flowing to the LED 1 when the operation temperature of the LED 1 is in the temperature range above the predetermined threshold temperature ($T_t$), and when the internal resistance of the LED 1 starts to vary in the temperature range due to ageing, such that brightness of light emitted by the LED 1 is stabilized and that durability of the LED 1 is relatively improved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A current regulating circuit for connection in series between a light emitting diode (LED) and a power source, said current regulating circuit comprising:
    a first resistive unit having a first resistance that is proportional to an operation temperature of the LED when the operation temperature of the LED is above a predetermined threshold temperature; and
    a second resistive unit connected in series with said first resistive unit, and having a second resistance that is inversely proportional to the operation temperature of the LED when the operation temperature of the LED is above the predetermined threshold temperature;
    wherein when the operation temperature of the LED is above the predetermined threshold temperature, an effective resistance of said current regulating circuit attributed to said first and second resistive units is proportional to the operation temperature of the LED, and absolute value of a rate of change of the first resistance is larger than that of the second resistance.

2. The current regulating circuit as claimed in claim 1, wherein when the operation temperature of the LED is equal to or lower than the predetermined threshold temperature, the effective resistance is substantially non-varying.

3. The current regulating circuit as claimed in claim 2, wherein when the operation temperature of the LED is equal to or lower than the predetermined threshold temperature, the absolute value of the rate of change of the first resistance is approximate to that of the second resistance, and absolute value of a rate of change of the effective resistance is below a predetermined value.

4. The current regulating circuit as claimed in claim 1, wherein when the operation temperature of the LED is above the predetermined threshold temperature, the absolute value of the rate of change of the first resistance within a predetermined temperature increment is at least twice larger than that of the second resistance.

5. The current regulating circuit as claimed in claim 4, wherein the predetermined temperature increment is 10 degrees Celsius.

6. The current regulating circuit as claimed in claim 1, wherein when the operation temperature of the LED is above the predetermined threshold temperature, a rate of change of the effective resistance within a temperature increment of 10 degrees Celsius is at least 5%.

7. The current regulating circuit as claimed in claim 1, wherein when the operation temperature of the LED is equal to an initial temperature, the second resistance of said second resistive unit is larger than or equal to one-half of the first resistance of said first resistive unit.

8. The current regulating circuit as claimed in claim 1, wherein said first resistive unit includes first and second resistor that are connected in series, said first resistor being a thermistor with a positive temperature coefficient, said second resistor being a thermistor with a negative temperature coefficient, absolute value of the temperature coefficient of said first resistor being larger than or equal to absolute value of the temperature coefficient of said second resistor.

9. The current regulating circuit as claimed in claim 1, wherein said second resistive unit includes third and fourth resistors that are connected in series, said third resistor being a thermistor with a positive temperature coefficient, said fourth resistor being a thermistor with a negative temperature coefficient, absolute value of the temperature coefficient of said third resistor being smaller than or equal to absolute value of the temperature coefficient of said fourth resistor.

10. The current regulating circuit as claimed in claim 1, wherein said first resistive unit includes a thermistor with a positive temperature coefficient, said second resistive unit including a thermistor with a negative temperature coefficient, absolute value of the temperature coefficient of said thermistor of said first resistive unit being larger than or equal to absolute value of the temperature coefficient of said thermistor of said second resistive unit.

11. A light emitting diode (LED) device adapted to be connected to a power source, comprising:
    an LED; and
    a current regulating circuit connected to said LED, and adapted to be connected to the power source such that said LED, said current regulating circuit, and the power source are connected in series, said current regulating circuit including a first resistive unit having a first resistance that is proportional to an operation temperature of the LED when the operation temperature of the LED is above a predetermined threshold temperature, and a second resistive unit connected in series with said first resistive unit, and having a second resistance that is inversely proportional to the operation temperature of the LED when the operation temperature of the LED is above the predetermined threshold temperature;

wherein when the operation temperature of the LED is above the predetermined threshold temperature, an effective resistance of said current regulating circuit attributed to said first and second resistive units is proportional to the operation temperature of the LED, and absolute value of a rate of change of the first resistance is larger than that of the second resistance.

\* \* \* \* \*